June 8, 1954
G. M. STANDAL
2,680,302
LAYOUT LEVEL
Filed April 24, 1953
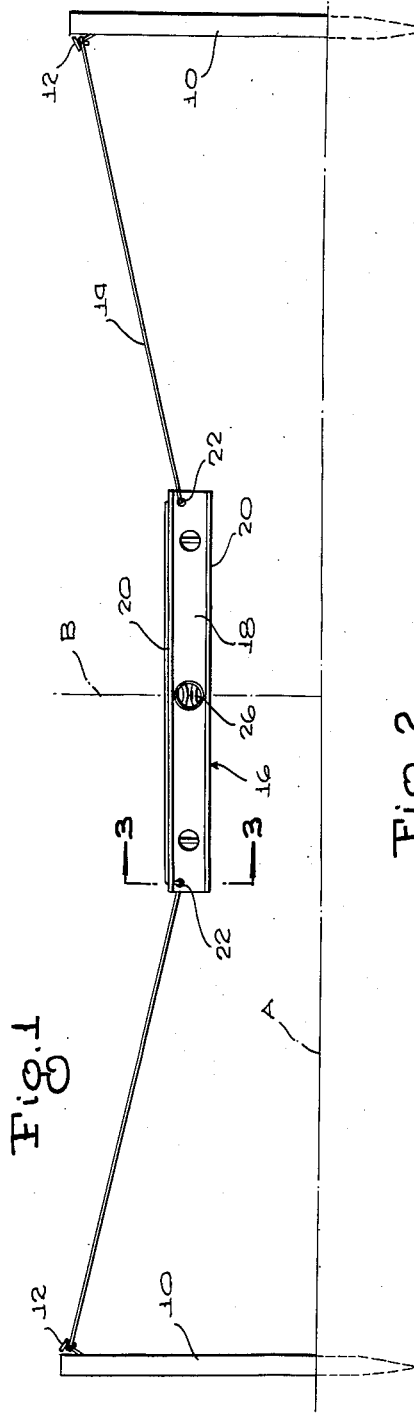
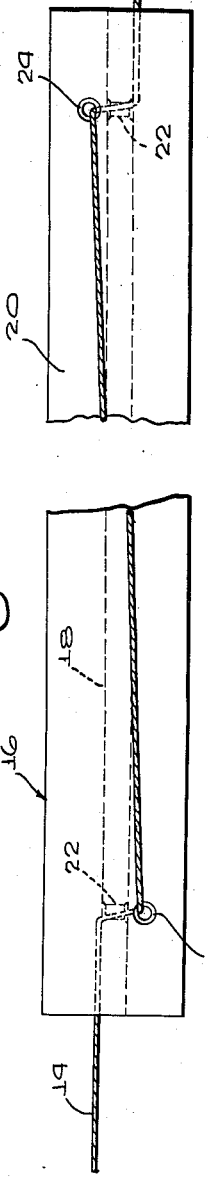
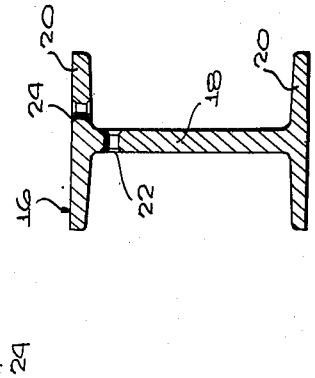
INVENTOR.
GEORGE M. STANDAL
BY
McMorrow, Berman + Davidson
ATTORNEYS Patented June 8, 1954

2,680,302

UNITED STATES PATENT OFFICE 2,680,302

LAYOUT LEVEL

George M. Standal, Chemainus, British Columbia, Canada

Application April 24, 1953, Serial No. 350,983

3 Claims. (Cl. 33—207)

This invention relates to spirit levels, and more particularly, has reference to a level of this general type which is particularly adapted for suspension on a line stretched between spaced supports, for indicating a horizontal line at a location disposed centrally between said supports.

An important object of the present invention is to provide a level construction as stated which will adapt the level for the purpose set forth, without increase in the cost of manufacture of the level.

Still another object is to provide a level construction as stated which will be adapted to permit a level to be used across two points in a speedy, inexpensive, and very simple operation.

Yet another object is to provide a level design which will not interfere in any way with normal use of the level for other purposes, while still permitting the level to be readily used on a line stretched between spaced supports.

A further object of importance is to provide a level construction wherein a plurality of openings will be so formed and relatively arranged in the body of the level as to permit the level to be swiftly threaded longitudinally of the supporting line to a selected location, with the line being so engaged in said openings as to insure the retention of the level at the selected point.

Other objects will appear from the following description, the claims appended thereto, and from the annexed drawing, in which like reference characters designate like parts throughout the several views, and wherein:

Figure 1 is a side elevational view of a level formed in accordance with the present invention, as it appears when suspended on a line stretched between spaced supports;

Figure 2 is an enlarged top plan view of the level, portions being broken away, the supporting line being illustrated fragmentarily; and Figure 3 is an enlarged transverse sectional view on line 3—3 of Figure 1.

The reference numeral 10 has been applied in the drawing to designate spaced, upstanding supports such as posts driven into the ground surface A. At their upper ends, the posts 10 have nails 12 or equivalent connecting means, and attached at its opposite ends to said nails is a line 14 stretched between the posts.

The level having the improvements constituting the present invention has been designated generally at 16, and as will be noted from Figure 3, is I-shaped in cross section. Thus, the level is provided, medially between its opposite sides, with a web 18 extending from end to end of the level, said web being integral, along its opposite longitudinal edges, with flanges 20 lying in planes normal to the plane of the web.

In the opposite end portions of the web 18 I form transverse openings 22 communicating between the opposite faces of the web. Said openings, as will be noted from Figure 2, are spaced equal distances from the web ends adjacent thereto. Further, the openings 22 are spaced closely from one of the flanges 20, the openings 22 being spaced equal distances from the plane of said adjacent flange.

In the flange adjacent openings 22 I form openings 24, communicating between the opposite faces of said flange. Each opening 24 is extended normally to the opening 22 associated therewith, as best shown in Figure 3. As shown in Figure 2, the openings 22 and 24 located at each end of the level are spaced equal distances from the adjacent end edge of the level body.

It is also important to note from Figure 2 that one opening 24 is spaced laterally of the plane of web 18 in one direction, while the other opening 24 is spaced laterally of the plane of the web in an opposite direction, the distances of the openings 24 from said plane of the web being equal.

In use of the level, a chalk line 14 would first be stretched tightly from one support 10 to the other. The user then marks the chalk line with colored crayon or the like, and doubles the line back to obtain a center mark, said center mark being aligned with an imaginary vertical line B shown in Figure 1.

The level is then threaded longitudinally of the chalk line, until the center bubble 26 thereof is aligned with the crayon mark, along said imaginary vertical line B.

The level will now be suspended horizontally upon the line 14, at a location disposed medially between the posts 10, and can be used in laying out foundations, machinery, or in any other operations requiring the indication of a horizontal line above a supporting surface such as that shown at A.

It will be appreciated that the improvement constituting the present invention can be incorporated in generally conventional levels without requiring substantial modification or redesign thereof, the cost of the improved level being the same as or little greater than the cost of a level not having said improvements. Further, the level can be used for any desired operations, such as in carpentry work, without being affected adversely by the changes of construction illustrated and described herein.

It is believed apparent that the invention is not necessarily confined to the specific use or uses thereof described above, since it may be utilized for any purpose to which it may be suited. Nor is the invention to be necessarily limited to the specific construction illustrated and described above, since such construction is only intended to be illustrative of the principles of operation and the means presently devised to carry out said principles, it being considered that the invention comprehends any minor changes in construction that may be permitted within the scope of the appended claims.

What is claimed is:

1. A level including a web and top and bottom flanges relatively arranged to define a body I-shaped in cross section, said web having transverse openings at its opposite ends and at least one of said flanges having openings extending transversely of the first-named openings and disposed adjacent thereto, for extension of a line through the several openings to suspend the level between spaced supports.

2. A level including a web and flanges extending longitudinally of opposite side edges thereof in planes normal to that of the web, to define a body I-shaped in cross section, said web having transverse openings at its opposite ends adjacent one of said flanges, said one flange having openings extending transversely of the first-named openings and disposed adjacent thereto, for extension of a line through the several openings to suspend the level between spaced supports.

3. A level including a web and flanges extending longitudinally of the opposite side edges thereof in planes normal to that of the web, to define a body I-shaped in cross section, said web having transverse openings at its opposite ends adjacent one of said flanges, said one flange having openings extending transversely of the first-named openings and disposed adjacent thereto, for extension of a line through the several openings to suspend the level between spaced supports, one of the flange openings being spaced laterally in one direction from the plane of the web and the other flange opening being spaced laterally of the plane of the web in an opposite direction, said flange openings being spaced equal distances from said plane of the web.

References Cited in the file of this patent

UNITED STATES PATENTS

| Number | Name | Date |
| --- | --- | --- |
| 1,303,829 | Vogel | May 13, 1919 |
| 2,386,833 | Baldwin | Oct. 16, 1949 |